United States Patent
Moriya

(10) Patent No.: US 10,771,754 B2
(45) Date of Patent: Sep. 8, 2020

(54) IMAGE WHITE BALANCE CORRECTION METHOD AND ELECTRONIC DEVICE

(71) Applicant: SAMSUNG ELECTRONICS CO., LTD., Suwon-si (KR)

(72) Inventor: Tsuyoshi Moriya, Yokohama (JP)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/345,893

(22) PCT Filed: Dec. 6, 2017

(86) PCT No.: PCT/KR2017/014199
§ 371 (c)(1),
(2) Date: Apr. 29, 2019

(87) PCT Pub. No.: WO2018/110889
PCT Pub. Date: Jun. 21, 2018

(65) Prior Publication Data
US 2019/0289269 A1    Sep. 19, 2019

(30) Foreign Application Priority Data
Dec. 14, 2016 (JP) .................... 2016-242481

(51) Int. Cl.
*H04N 9/73* (2006.01)
*G03B 15/05* (2006.01)
(Continued)

(52) U.S. Cl.
CPC ........... *H04N 9/735* (2013.01); *G03B 7/091* (2013.01); *G03B 15/03* (2013.01); *G03B 15/05* (2013.01);
(Continued)

(58) Field of Classification Search
None
See application file for complete search history.

(56) References Cited

U.S. PATENT DOCUMENTS

| 5,808,681 A | 9/1998 | Kitajima |
| 7,714,929 B2 | 5/2010 | Kim |

(Continued)

FOREIGN PATENT DOCUMENTS

| JP | 3540485 B2 | 7/2004 |
| JP | 2009-118001 A | 5/2009 |

(Continued)

OTHER PUBLICATIONS

Written Opinion (PCT/ISA/237) issued by the International Searching Authority in corresponding International Application No. PCT/KR2017/014199, dated Mar. 29, 2018.

(Continued)

*Primary Examiner* — Cynthia Segura
(74) *Attorney, Agent, or Firm* — Sughrue Mion, PLLC

(57) ABSTRACT

Provided is a method of correcting a white balance (WB) of an image includes obtaining a first image captured by photographing a subject when a flash emits light, and a second image captured by photographing the subject when the flash emits no light; obtaining a WB gain of the first image and a WB gain of the second image; obtaining a color balance (CB) of flash light, based on at least one of the obtained WB gains of the first and second images; and correcting a WB of the first image, based on the CB of the flash light.

12 Claims, 5 Drawing Sheets

(51) Int. Cl.
    *H04N 9/64*         (2006.01)
    *H04N 5/235*       (2006.01)
    *H04N 9/04*         (2006.01)
    *H04N 1/60*         (2006.01)
    *H04N 5/238*       (2006.01)
    *G03B 7/091*      (2006.01)
    *G03B 15/03*      (2006.01)

(52) U.S. Cl.
    CPC ........... *H04N 1/6086* (2013.01); *H04N 5/235* (2013.01); *H04N 5/238* (2013.01); *H04N 9/04* (2013.01); *H04N 9/646* (2013.01)

(56) References Cited

U.S. PATENT DOCUMENTS

| | | | |
|---|---|---|---|
| 7,868,929 B2 | 1/2011 | Fujiwara | |
| 8,441,552 B2* | 5/2013 | Yoshida | H04N 9/735 348/223.1 |
| 8,704,911 B2 | 4/2014 | Shimizu | |
| 9,479,707 B2 | 10/2016 | Sako et al. | |
| 10,070,111 B2* | 9/2018 | Sunkavalli | H04N 9/735 |
| 10,200,663 B2* | 2/2019 | Saito | H04N 1/46 |
| 2002/0145674 A1* | 10/2002 | Nakamura | H04N 5/2355 348/296 |
| 2006/0008171 A1* | 1/2006 | Petschnigg | G06T 5/50 382/254 |
| 2010/0177208 A1* | 7/2010 | Tamaru | H04N 5/23212 348/222.1 |
| 2011/0074928 A1* | 3/2011 | Misawa | G06T 7/593 348/47 |
| 2011/0157412 A1* | 6/2011 | Yoshida | H04N 9/735 348/223.1 |
| 2011/0157413 A1* | 6/2011 | Yoshida | H04N 9/735 348/223.1 |
| 2012/0113295 A1* | 5/2012 | Kitagawa | H04N 5/2351 348/224.1 |
| 2012/0274798 A1* | 11/2012 | Takahashi | H04N 9/045 348/222.1 |
| 2012/0281108 A1* | 11/2012 | Fukui | H04N 5/144 348/223.1 |
| 2014/0168466 A1* | 6/2014 | Yoshida | H04N 5/2354 348/224.1 |
| 2014/0176759 A1 | 6/2014 | Goto | |
| 2014/0293089 A1 | 10/2014 | Kitagawa et al. | |
| 2015/0215545 A1* | 7/2015 | Hayashi | G02B 7/34 348/240.3 |
| 2016/0295189 A1 | 10/2016 | Fujiwara et al. | |
| 2017/0013243 A1* | 1/2017 | Fujiwara | H04N 9/735 |
| 2017/0094240 A1* | 3/2017 | Saito | G06T 5/008 |
| 2017/0094241 A1* | 3/2017 | Fujiwara | H04N 1/46 |

FOREIGN PATENT DOCUMENTS

| | | |
|---|---|---|
| JP | 2010-193048 A | 9/2010 |
| JP | 2011-135378 A | 7/2011 |
| JP | 4757927 B2 | 8/2011 |
| JP | 4761066 B2 | 8/2011 |
| JP | 2016-122989 A | 7/2016 |
| KR | 10-2005-0074789 A | 7/2005 |
| KR | 10-2010-0096494 A | 9/2010 |
| KR | 10-2011-0074443 A | 6/2011 |
| KR | 10-2012-0025414 A | 3/2012 |
| KR | 10-2012-0049138 A | 5/2012 |
| WO | WO-2015151747 A1 * 10/2015 ............. H04N 9/735 |

OTHER PUBLICATIONS

International Search Report (PCT/ISA/210), issued by International Searching Authority in corresponding International Application No. PCT/KR2017/014199, dated Mar. 29, 2018.

Communication dated Oct. 9, 2019, issued by the European Patent Office in counterpart European Application No. 17881415.8.

* cited by examiner

IMAGE WHITE BALANCE CORRECTION METHOD AND ELECTRONIC DEVICE

TECHNICAL FIELD

The present disclosure relates to a method and an electronic device for correcting a white balance (WB) of an image. More particularly, the present disclosure relates to a method and an electronic device for correcting a WB of an image captured using flash light.

BACKGROUND ART

Photographing apparatuses may photograph a subject by turning on a flash in order to resolve a lack of light exposure under a dark environment. In images captured using flash light, a color difference is generated between a subject reached by the flash light and a background not reached by the flash light, and thus a white balance (WB) of an image may be impaired.

Accordingly, photographing apparatuses may previously measure and store a color balance (CB) of flash light, and read the pre-stored CB of the flash light during each photographing to thereby correct a WB of an image captured using the flash light.

However, according to a method of correcting a WB of an image by using a pre-stored CB of flash light, it is difficult to cope with degradation caused due to individual differences between flashes or a time lapse. Therefore, the WB of an image may be corrected using a CB of flash light used during photography instead of using a pre-stored CB of flash light.

DESCRIPTION OF EMBODIMENTS

Solution to Problem

Provided are a method and an electronic device for obtaining a color balance (CB) with respect to flash light during photography and optimally correcting a WB of a captured image by using the CB of the flash light.

Advantageous Effects of Disclosure

According to an embodiment, because a white balance (WB) of an image may be adjusted according to a color balance (CB) of flash light used during photography, an image of a more natural color may be obtained.

BEST MODE

Figure 1:
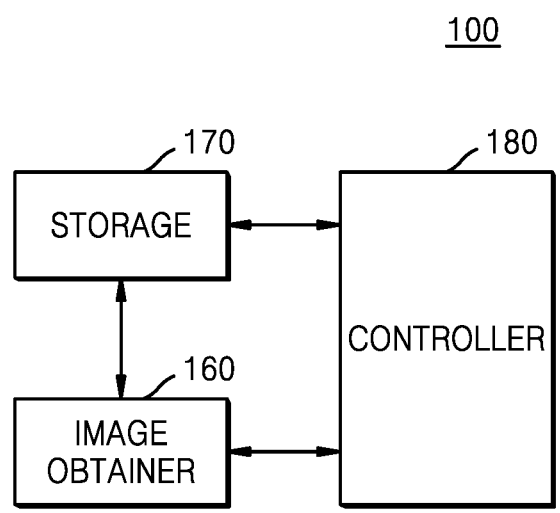
FIGS. 1 and 2 are block diagrams of an electronic device according to an embodiment.

According to an aspect of the present disclosure, a method of correcting a white balance (WB) of an image includes obtaining a first image captured by photographing a subject when a flash emits light, and a second image captured by photographing the subject when the flash emits no light; obtaining a WB gain of the first image and a WB gain of the second image; obtaining a color balance (CB) of flash light, based on at least one of the obtained WB gains of the first and second images; and correcting a WB of the first image, based on the CB of the flash light.

According to another aspect of the present disclosure, an electronic device includes an image obtainer configured to obtain a first image captured by photographing a subject when a flash emits light, and a second image captured by photographing the subject when the flash emits no light; a memory storing the first image and the second image; and a controller configured to obtain a WB gain of the first image and a WB gain of the second image, obtain a CB of flash light, based on at least one of the obtained WB gains of the first and second images, and correct a WB of the first image, based on the CB of the flash light.

According to another aspect of the present disclosure, a computer-readable recording medium has recorded thereon a program, which, when executed by a computer, performs the above-described method.

MODE OF DISCLOSURE

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the embodiments set forth herein. In the drawings, parts irrelevant to the description are omitted for simplicity of explanation, and like numbers refer to like elements throughout.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

The disclosure will now be described more fully with reference to the accompanying drawings, in which exemplary embodiments of the disclosure are shown.

FIG. 1 is a block diagram of an electronic device 100 according to an embodiment.

Referring to FIG. 1, the electronic device 100 may include a storage 170, an image obtainer 160, and a controller 180. However, all of the illustrated components are not essential. The electronic device 100 may be implemented by more or less components than those illustrated in FIG. 1.

Figure 2:
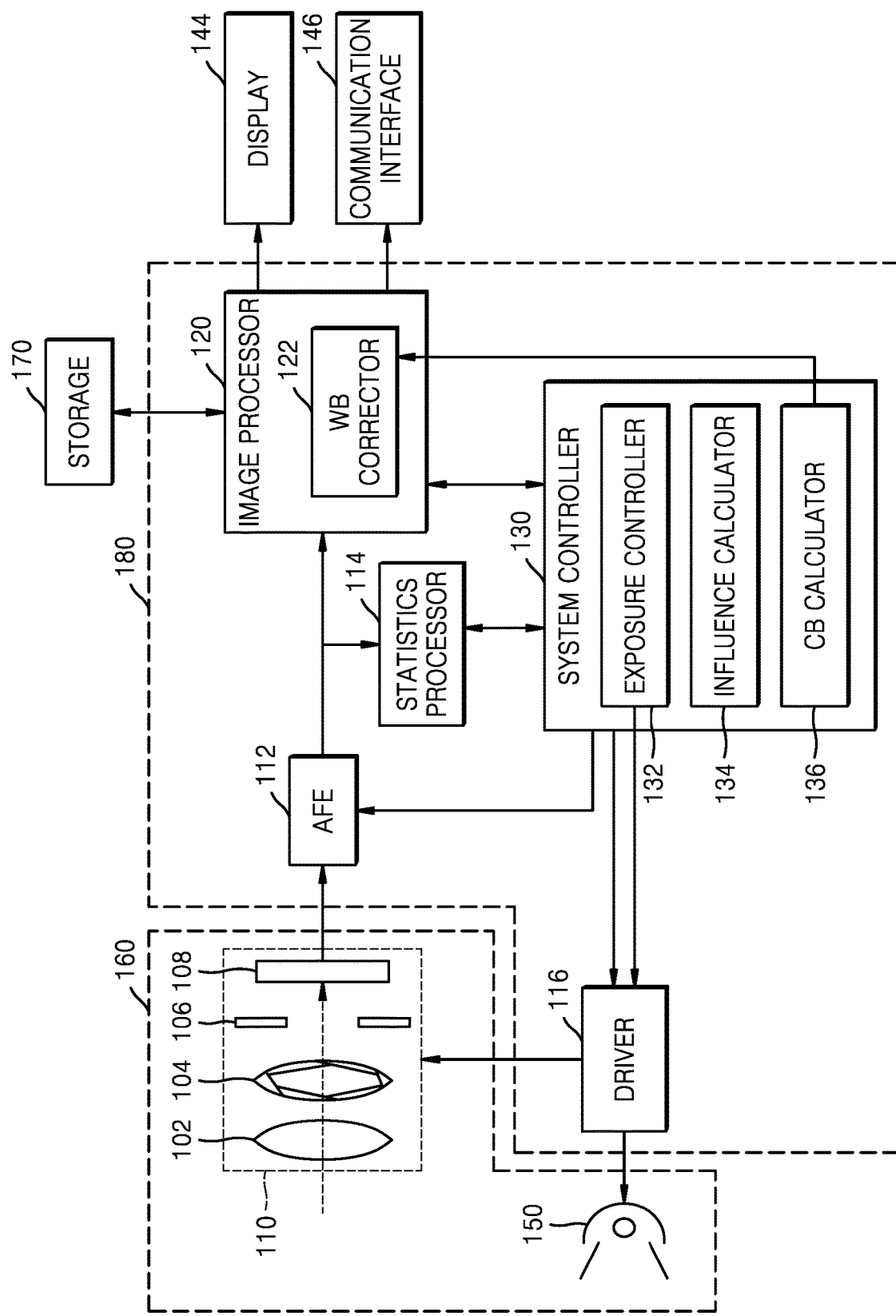

For example, referring to FIG. 2, the electronic device 100 may further include a display 144 and a communication interface 146 in addition to the storage 170, the image obtainer 160, and the controller 180.

The electronic device 100 may include various types of devices capable of performing a function of correcting an image captured by photographing a subject. For example, the electronic device 100 may be, but is not limited to, a smartphone, a tablet personal computer (PC), a PC, a smart TV, a mobile phone, a personal digital assistant (PDA), a laptop, a media player, a micro-server, a navigation device, or other mobile or non-mobile computing devices. The electronic device 100 may also be a wearable device, such as a watch, glasses, a hair band, or a ring each having a communication function and a data processing function. The electronic device 100 may also be a camera, such as a compact camera, a Digital Single Lens Reflex (DSLR) camera, or a mirrorless camera. However, the electronic device 100 is not limited thereto, and examples of the electronic device 100 may include all kinds of apparatuses capable of correcting a captured image.

The aforementioned components will now be described in detail.

The image obtainer 160 may obtain an image by photographing a subject. The image obtainer 160 may include a flash 150, and thus may use the flash 150 as an auxiliary light source during photography. The image obtainer 160 may photograph a subject by using the flash 150, according to several techniques such as filling-in light, backlight correction, catching light, and daylight synchro.

However, when the flash 150 is used during photography, a region of a large portion of an image may be saturated with a white color or cloudiness may occur, due to flash light. Accordingly, the electronic device 100 may correct a white balance (WB) of an image captured in an environment where the flash 150 emits light, thereby correcting the color of the image.

Because the image obtainer 160 generates an image by changing incoming light into an electrical signal, the color of the subject of the captured image may be changed according to a light source. Accordingly, to correct the color of the subject, the electronic device 100 may adjust a WB gain being a coefficient by which each color value of an image is multiplied. According to the adjusted WB gain, the electronic device 100 may adjust the WB of the image such that a white subject is displayed in white.

According to an embodiment, the correction of the WB may be performed by setting the WB gain according to a light source used during photography. For example, during flash photography, the WB gain of the image may be corrected based on a color balance (CB) of flash light. A CB for a light source may represent the strength of each color component (e.g., red (R), green (G), and blue (B)) of the light source.

For example, when a B component of light radiated to a subject is strong, the electronic device 100 may correct the WB gain of an image such that sensitivity of the B component of the light decreases. On the other hand, when a color temperature of light radiated to a subject is low and R light is strong, the electronic device 100 may correct the WB gain of an image such that sensitivity of the R component of the light decreases. Thus, according to an embodiment, different WB gains may be set according to light radiated to a subject.

A CB of a light source according to an embodiment may be obtained based on the WB gain of an image corresponding to the light source. For example, the CB of the light source may correspond to a reciprocal of the WB gain of the corresponding image.

For example, a reciprocal of the WB gain of an image captured at ambient light without flash light may correspond to a CB for the ambient light. A reciprocal of the WB gain of an image captured under an environment where flash light is added to ambient light may correspond to a CB for a light source having ambient light in addition to flash light.

According to an embodiment, the ambient light may denote light existing in a surrounding environment of a subject photographed to capture an image, excluding flash light.

According to an embodiment, when the flash of the image obtainer 160 emits light, the image obtainer 160 may capture an image under the environment where flash light is added to ambient light. Accordingly, to correct an image captured when the flash emits light, the electronic device 100 according to an embodiment may obtain a CB for ambient light and a CB for a light source having ambient light in addition to flash light, based on a WB gain of an image captured at ambient light without flash light and a WB gain of an image captured under an environment where flash light is added to ambient light. The electronic device 100 may obtain a CB for the flash light, based on at least one of the obtained CBs, and may correct the image captured when the flash emits light, based on the CB for the flash light.

Referring to FIG. 2, the image obtainer 160 may include an imaging unit 110 and the flash 150. The image unit 110 may include a lens 102, an aperture 104, a shutter 106, and an imaging device 108.

The lens 102 may be a resin lens that is molded, and may focus light incident upon the image obtainer 160 on an image-forming surface of the imaging device 108. The lens 102 may include a plurality of lenses, and may include a correction lens that corrects shake.

The aperture 104 may adjust the depth of field by limiting the amount of light.

The shutter 106 may adjust a time period during which the light incident upon the image obtainer 160 passes.

The aperture 104 and the shutter 106 may not be constructed as separate units, but may be included, as an aperture shutter unit performing both respective functions of the aperture 104 and the shutter 106, in the image obtainer 160. The function of the shutter 106 may be replaced by an electronic shutter that may be operated by the imaging device 108. In this case, a structural shutter unit may be omitted.

The imaging device 108 may include a photoelectric conversion device, such as a charge coupled device (CCD), an image sensor, or a complementary metal-oxide semiconductor (CMOS) image sensor. On each pixel constituting the imaging device 108, R, G, and B color filters may be arranged in a bayer pattern. The imaging device 108 may transform the light focused on the image-forming surface into an electrical signal and transmit the electrical signal to an analog front end (AFE) 112 of the controller 180.

The flash 150 may emit light under the control of the controller 180 in order to brighten surroundings during image capturing at a dark place. For example, the flash 150 may include a light-emitting diode (LED) having a high brightness, and may emit light in synchronization with a charge-accumulation time period of the imaging device 108.

The storage 170 may store a program used by the controller 180 to perform processing and control, and may also store data that is input to or output from the electronic device 100. The storage 170 according to an embodiment may store one or more pieces of image data obtained by the image obtainer 160.

The storage 170 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

For example, the storage 170 may temporarily store an image signal calculated by the controller 180, and may store at least one image signal. The storage 170 may also store an image of which a WB has been corrected by the electronic device 100.

The controller 180 may correct a WB of a first image captured when a flash emits light, based on the first image and a second image captured when the flash does not emit light. According to an embodiment, the controller 180 may obtain a CB of flash light, based on the first image and the second image, and may correct the WB of the first image, based on the CB of the flash light. The controller 180 may obtain a WB gain of the first image, based on the CB of the flash light, and may correct the WB of the first image, based on the obtained WB gain of the first image.

According to an embodiment, the first image and the second image may be an image captured when a flash emits light, and an image captured when the flash does not emit light, respectively.

The controller 180 may obtain respective WB gains for the first image and the second image. The WB gain of each image may vary according to a light source used when each image is captured. For example, the WB gain of the first image may correspond to a reciprocal of a CB for a light source having the flash light in addition to the ambient light. The WB gain of the second image may correspond to a reciprocal of a CB for the ambient light.

The controller 180 may also obtain an influence of the flash light on the first image, based on respective luminance values of the first and second images. The luminance value of each image may be determined based on an exposure control value including an aperture value, a shutter velocity, sensor sensitivity, and the like, and a brightness value of the image.

According to an embodiment, the influence of the flash light may represent the influence of the flash light with respect to the color of the entire image.

According to an embodiment, the controller 180 may obtain the CB of the flash light, based on at least one of the WB gains of the first and second images and the influence of the flash light.

According to an embodiment, the controller 180 may obtain a WB gain for correcting the first image, based on the CB of the flash light. For example, the controller 180 may split the first image and the second image into one or more blocks and may obtain a difference between the luminance values of the first and second images for each block. The controller 180 may obtain a dispersion value, for example, as a representative value for differences between luminance values, and may obtain the WB gain for correcting the first image, based on at least one of the dispersion, the CB for the flash light, and the CB for the light source having the flash light in addition to the ambient light.

A method of obtaining the WB gain for correcting the first image will now be described with reference to FIG. 2.

Referring to FIG. 2, the controller 180 may include the AFE 112, a statistics processor 114, an image processor 120, a system controller 130, and a driver 116.

The AFE 112 may generate an RGB image signal by performing color separation, analog/digital (A/D) conversion, defective pixel correction, black-level correction, shading correction, or the like with respect to an image signal received from the imaging device 108. The RGB image signal may be transmitted to the statistics processor 114 and the image processor 120.

The statistics processor 114 may perform a plurality of statistics processing operations by splitting the RGB image signal into one or more blocks (e.g., 8 pixels×8 pixels). According to an embodiment, the statistics processor 114 may be implemented using a large scale integration (LSI). For example, the statistics processor 114 may calculate an average value of at least one of R, G, and B components of an image or calculate a WB gain of the image. According to an embodiment, the WB gain of the image may not be obtained using one method but may be obtained using any of various methods for obtaining the WB gain of the image. A result of the calculation may be transmitted to the system controller 130.

The image processor 120 may perform various operations for processing an image according to a control signal of the system controller 130. According to an embodiment, the image processor 120 may be implemented using an application specific integrated circuit (ASIC). For example, the image processor 120 may perform bayer color interpolation, edge emphasis, gamma correction, noise reduction, and the like with respect to an image. The image processor 120 may generate image data by converting the RGB image signal to an YCbCr (YCC) image signal or performing compression in a file format such as a joint photographic coding experts group (JPEG) or a graphics interchange format (GIF).

The image processor 120 may include a WB corrector 122 that corrects a WB. The WB corrector 122 according to an embodiment may correct the WB of the first image according to the WB gain determined based on the CB for the flash light.

To perform various types of image processing, the image processor 120 may use the storage 170 that stores an image signal. For example, the image processor 120 may use the storage 170 to temporally store an image signal that is under image processing or to store generated image data.

According to an embodiment, the image processor 120 may transmit the generated image data to the display 144 such that the generated image data is displayed on the display 144.

The display 144 displays and outputs information that is processed by the electronic device 100. For example, the display 144 may display a software keyboard. The display 144 may display at least one of the image captured by the image obtainer 160 and the image of which a WB has been corrected by the controller 180.

When the display 144 forms a layer structure together with a touch pad to construct a touch screen, the display 144 may be used as an input device as well as an output device. The display 144 may include at least one of a liquid crystal display (LCD), a thin film transistor-liquid crystal display (TFT-LCD), an organic light-emitting diode (OLED), a flexible display, a three-dimensional (3D) display, and an electrophoretic display. According to embodiments of the electronic device 100, the electronic device 100 may include two or more displays 144.

According to an embodiment, the image processor 120 may transmit the generated image data to an external device (not shown) via the communication interface 146.

The communication interface 146 may include one or more components that enable the electronic device 100 to communicate with the external device. For example, the communication interface 146 may include a short-range wireless communication interface (not shown), a mobile communication interface (not shown), and a broadcasting receiver (not shown).

Examples of the short-range wireless communication interface may include, but are not limited to, a Bluetooth communication interface, a Bluetooth Low Energy (BLE) communication interface, a near field communication (NFC) interface, a wireless local area network (WLAN) (e.g., Wi-Fi) communication interface, a ZigBee communication interface, an infrared Data Association (IrDA) communication interface, a Wi-Fi direct (WFD) communication interface, an ultra wideband (UWB) communication interface, and an Ant+ communication interface.

The mobile communication interface may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcasting receiver receives a broadcasting signal and/or broadcasting-related information from an external source via a broadcasting channel. The broadcasting channel may be a satellite channel, a ground wave channel, or the like. According to embodiments, the electronic device 100 may not include the broadcasting receiver.

The system controller 130 may control overall operations of the electronic device 100. For example, the system controller 130 may accomplish control via a control program, a lookup table, a parameter, and the like received from a system memory or an external apparatus. The system controller 130 may include an exposure controller 132, an influence calculator 134, and a CB calculator 136.

The exposure controller 132 may determine exposure control values for photographing, based on a result of the processing by the statistics processor 114, generate a control signal that enable photographing according to the determined exposure control values, and transmit the generated control signal to the driver 116.

For example, the exposure controller 132 may determine appropriate exposure control values from a pre-captured image (e.g., an electronic view finder (EVF) image) from the statistics processor 114. The driver 116 may control the flash 150 and the imaging unit 110 according to at least one of an aperture value, a shutter velocity, and sensor sensitivity (e.g., International Organization of Standardization (ISO) sensitivity), which are the exposure control values determined by the exposure controller 132.

For example, the system controller 130 may consecutively obtain the first image and the second image captured according to the exposure control values determined by the exposure controller 132. The respective exposure control values of the first and second images may be determined to be the same values, but may also be determined to be different values.

The influence calculator 134 may calculate respective representative luminance values for the first image and the second image, based on the exposure control values during image capturing and at least one of the color components of each of the first image and the second image.

According to an embodiment, a representative luminance value for each image may be obtained based on a luminance value corresponding to the exposure control values of the image.

For example, a luminance value $Bv_e$ corresponding to the exposure control values of the second image may be obtained from the exposure control values according to Equation 1 below.

$$Bv_e = Av_e + Tv_e - Sv_e \quad \text{[Equation 1]}$$

In addition, a luminance value $Bv_{ef}$ corresponding to the exposure control values of the first image may be obtained from the exposure control values according to Equation 2 below.

$$Bv_{ef} = Av_{ef} + Tv_{ef} - Sv_{ef} \quad \text{[Equation 2]}$$

In Equations 1 and 2, the aperture value from among the exposure control values of the second image is indicated by $Av_e$, the shutter velocity therefrom is indicated by $Tv_e$, and the sensor sensitivity therefrom is indicated by $Sv_e$, and the aperture value from among the exposure control values of the first image is indicated by $Av_{ef}$, the shutter velocity therefrom is indicated by $Tv_{ef}$, and the sensor sensitivity therefrom is indicated by $Sv_{ef}$.

According to an embodiment, the exposure control values of Equations 1 and 2, such as an aperture value, a shutter velocity, and sensor sensitivity, may be determined according to the Additive system of Photographic Exposure (APEX) standard. However, the exposure control values according to an embodiment are not limited to the aforementioned example, and may be determined according to a user input or according to any of various other methods.

A difference between a luminance value obtained according to exposure control values and a representative luminance value of each image may be obtained according to Equations 3 and 4. According to an embodiment, the representative luminance value of each image may be obtained based on the luminance value and the difference corresponding to the exposure control values of the image obtained according to Equations 1 through 4. According to an embodiment, the representative luminance value for each image may be a value representing a brightness degree of the entire image or a subject included in the image.

A luminance difference $\Delta Bv_e$ of the second image may be determined by using Equation 3.

$$\Delta Bv_e = \log_2 \frac{RG_e}{AET} \quad \text{[Equation 3]}$$

A luminance difference $\Delta Bv_{ef}$ of the first image may be determined by using Equation 4.

$$\Delta Bv_{ef} = \log_2 \frac{RG_{ef}}{AET} \quad \text{[Equation 4]}$$

In Equations 3 and 4, a certain constant value used when the exposure control values are determined according to the APEX standard is indicated by AET, and average value of G components from among the respective color components of the first image and the second image are indicated by $RG_e$ and $RG_{ef}$, respectively.

According to an embodiment, the present disclosure is not limited to the aforementioned example, and, in Equations 3 and 4, each of the aforementioned luminance differences may be obtained according to a value determined based on at least one of the color components of an image that may represent brightness of the image.

A representative luminance value $BV_e$ of the second image may be determined according to Equation 5 below, based on the luminance value and the luminance difference obtained using Equations 1 and 3.

$$BV_e = Bv_e + \Delta Bv_e \quad \text{[Equation 5]}$$

A representative luminance value $BV_{ef}$ of a light-emission image may be determined according to Equation 6 below, based on the luminance value and the luminance difference of the subject obtained using Equations 2 and 4.

$$BV_{ef} = Bv_{ef} + \Delta Bv_{ef} \quad \text{[Equation 6]}$$

The above-described Equations 1 through 6 represent a method of obtaining a representative luminance value of an image according to the APEX standard. The present disclosure is not limited to the aforementioned example, and a representative luminance value of each image may be obtained using any of various other methods.

The influence calculator 134 may obtain an influence $P_f$ of flash light according to Equation 7, based on the representative luminance values of the images determined according to Equations 5 and 6. According to the APEX standard, because the luminance values $Bv_e$ and $Bv_{ef}$ of Equations 1 and 2 are values to which log 2 has been applied, the influence $P_f$ may be obtained using Equation 7 below.

$$P_f = \frac{2^{BV_{ef}} - 2^{BV_e}}{2^{BV_{ef}}} \qquad \text{[Equation 7]}$$

The above-described Equation 7 represents a method of obtaining the influence $P_f$ of flash light according to the APEX standard. The present disclosure is not limited to the aforementioned example, and the influence of flash light may be determined using any of various other methods, based on the representative luminance value (e.g., an average value) of each image.

The CB calculator 136 may obtain the CB of the flash light, based on at least one of the influence of the flash light obtained by the influence calculator 134 and the respective WB gains of the first and second images.

The CB calculator 136 may obtain a WB gain $W_{ef}$ ($W_{efr}$, $W_{efg}$, $W_{efb}$) of the first image and a WB gain $W_e$ ($W_{er}$, $W_{eg}$, $W_{eb}$) of the second image. $W_{er}$ and $W_{efr}$ indicate WB gains calculated for an R signal, $W_{eg}$ and $W_{efg}$ indicate WB gains calculated for a G signal, and $W_{eb}$ and $W_{efb}$ indicate WB gains calculated for a B signal. The WB gain of each image may be obtained according to various WB calculation methods.

A CB $C_e$ ($C_{er}$, $C_{eg}$, $C_{eb}$) of ambient light is a reciprocal of the WB gain $W_e$ of the second image, and may be obtained according to Equation 8 below.

$$P_f = \frac{2^{BV_{ef}} - 2^{BV_e}}{2^{BV_{ef}}} \qquad \text{[Equation 8]}$$

A CB $C_{ef}$ ($C_{efr}$, $C_{efg}$, $C_{efb}$) of a light source in which flash light is added to ambient light is a reciprocal of the WB gain $W_{ef}$ of the first image, and may be obtained according to Equation 9 below.

$$C_{ef} = \frac{1}{W_{ef}} \qquad \text{[Equation 9]}$$

The CB calculator 136 may obtain a CB $C_f$ ($C_{fr}$, $C_{fg}$, $C_{fb}$) of the flash light, based on the CB $C_e$ of the ambient light, the CB $C_{ef}$ of the light source in which flash light is added to ambient light, and the influence $P_f$ of the flash light, according to Equation 10 below.

$$C_f = \frac{C_{ef} - C_e \times (1 - P_f)}{P_f} \quad (P_f \neq 0) \qquad \text{[Equation 10]}$$

$$C_f = C_e \quad (P_f = 0)$$

The CB of the flash light obtained using Equation 10 may be determined not by a predetermined CB but by actual radiation of a flash. Accordingly, the CB of the flash light obtained according to an embodiment may not have an error due to individual differences between flashes, a difference in the amount of emitted light, or an error due to degradation.

The WB corrector 122 may obtain the WB gain for correcting the first image, based on the CB $C_f$ of the flash light determined using Equation 10. The WB corrector 122 may correct the WB of the first image according to the determined WB gain.

A method of obtaining the WB gain for correcting the first image, based on the CB of the flash light, will now be described in detail.

The statistics processor 114 may split the first image into w×h blocks, and the influence calculator 134 may obtain a representative luminance value $Bv_{ef}$ in each block as $S_{ef}$[x][y] according to Equations 2, 4 and 6. The statistics processor 114 may also split the second image into w×h blocks, and the influence calculator 134 may obtain a representative luminance value $Bv_e$ in each block as $S_e$[x][y] according to Equations 1, 3 and 5.

The WB corrector 122 may obtain a difference between $S_e$[x][y] and $S_{ef}$[X][y] between corresponding blocks in the first and second images according to Equation 11 below.

$$D_f[x][y] = S_{ef}[x][y] - S_e[x][y] \qquad \text{[Equation 11]}$$

The WB corrector 122 may obtain a dispersion value of a difference $D_f$[x][y] for one or more blocks of an image according to Equation 12 below.

$$W_f = \frac{1}{Pm(v) \times C_f + (1 - Pm(v)) \times C_{ef}} \qquad \text{[Equation 12]}$$

A WB gain $W_f$ for correcting the first image may be determined based on a predetermined evaluation function Pm(v) using a dispersion value v obtainable according to Equation 12 as a factor and the CB $C_f$ of the flash light, according to Equation 13 below.

$$W_f = \frac{1}{Pm(v) \times C_f + (1 - Pm(v)) \times C_{ef}} \qquad \text{[Equation 13]}$$

where Pm(v) indicates a ratio (0≤Pm(v)≤1) that reflects the CB of the flash light in the WB gain $W_f$, and may be previously determined to increase as the dispersion value v increases. Similar to the CB $C_f$, the WB gain $W_f$ may be obtained for each of the R, G, and B components.

According to an embodiment, when the first image is corrected by the WB gain $W_f$ determined based on the CB of the flash light, the WB of an image may be actually corrected by a CB due to the amount of light emitted by the flash 150. In a method of correcting the WB of an image, according to an embodiment, an image of a more natural color may be obtained.

The WB gain $W_f$ may be determined according to Equations 11 through 13, but the present disclosure is not limited thereto. The WB gain $W_f$ may be determined according to any of various other methods.

The driver 116 may control the imaging unit 110 and the flash 150. According to an embodiment, the driver 116 may control at least one of the lens 102, the aperture 104, the shutter 106, the imaging device 108, and the flash 150, according to the exposure control values determined by the exposure controller 132. For example, the driver 116 may adjust the focal point of the lens 102 or drive the aperture 104. The driver 116 may open or close the shutter 107, or control resetting or an electrical signal of the imaging device 108, or adjust the amount of light emitted by the flash 150.

Figure 3:
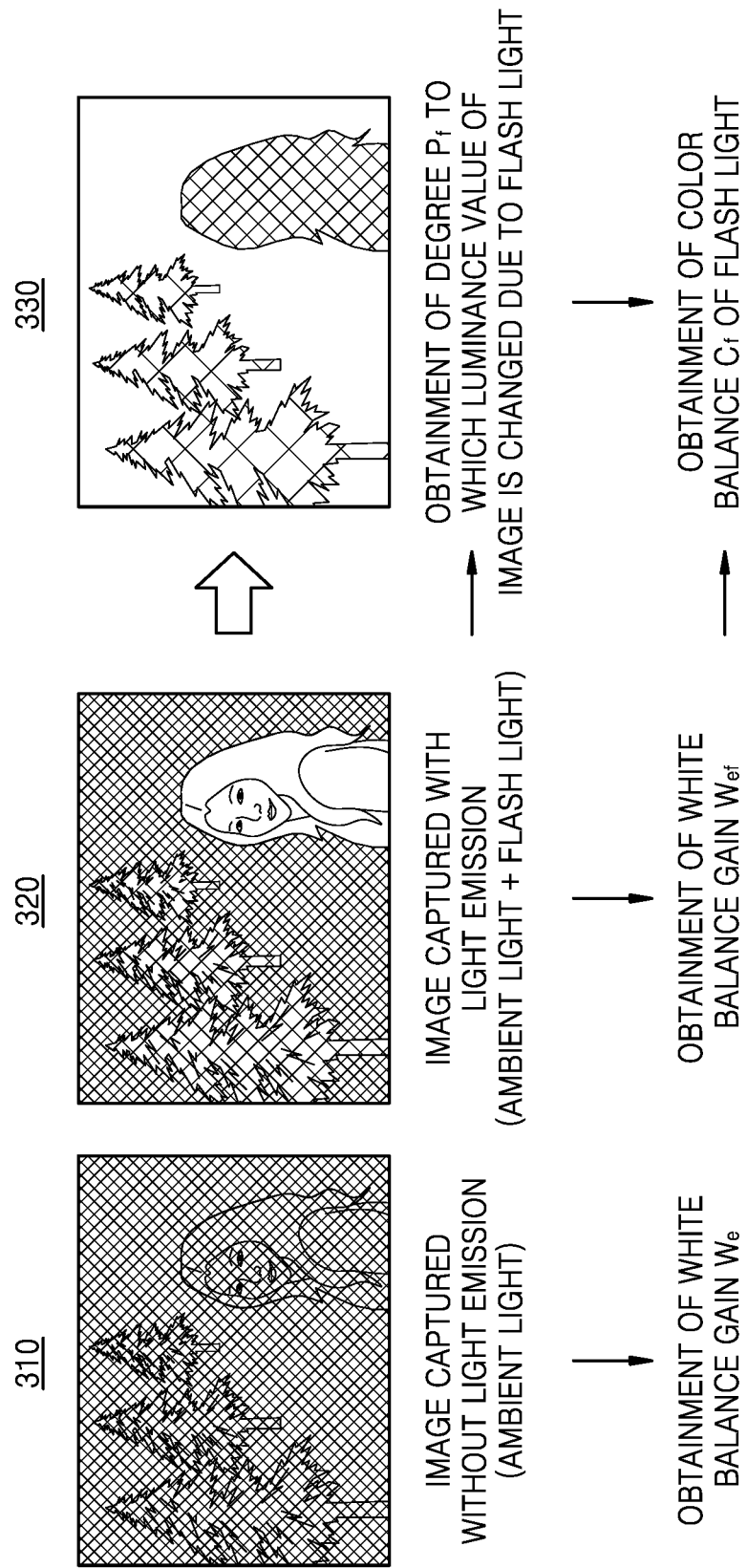
FIG. 3 is an exemplary view for explaining a color balance (CB) of flash light, according to an embodiment.

FIG. 3 is an exemplary view for explaining a CB of flash light according to an embodiment.

A view 310 of FIG. 3 illustrates an example of a second image captured without radiation of a flash. As photographing is performed with only ambient light, the second image may be entirely displayed in a dark color.

A view 320 of FIG. 3 illustrates an example of a first image captured when the flash emits light. Because the first image is captured with flash light in addition to ambient light, a subject (human being) closed to the electronic device 100 may be displayed brightly, and trees slightly far from the electronic device 100 may be displayed more brightly than those in the second image. The background of the first image may be displayed in similar brightness to brightness for the background of the second image.

A view 330 of FIG. 3 illustrates an example of an influence $P_f$ of the flash light on an image. The influence P of the flash light on the image represents a numerical value regarding how much only the flash light gives changes to the entire image.

As illustrated in FIG. 3, the CB $C_f$ of the flash light may be obtained based on the WB gains $W_e$ and $W_{ef}$ of the second image and the first image and the influence Pf of the flash light on an image.

Figure 4:
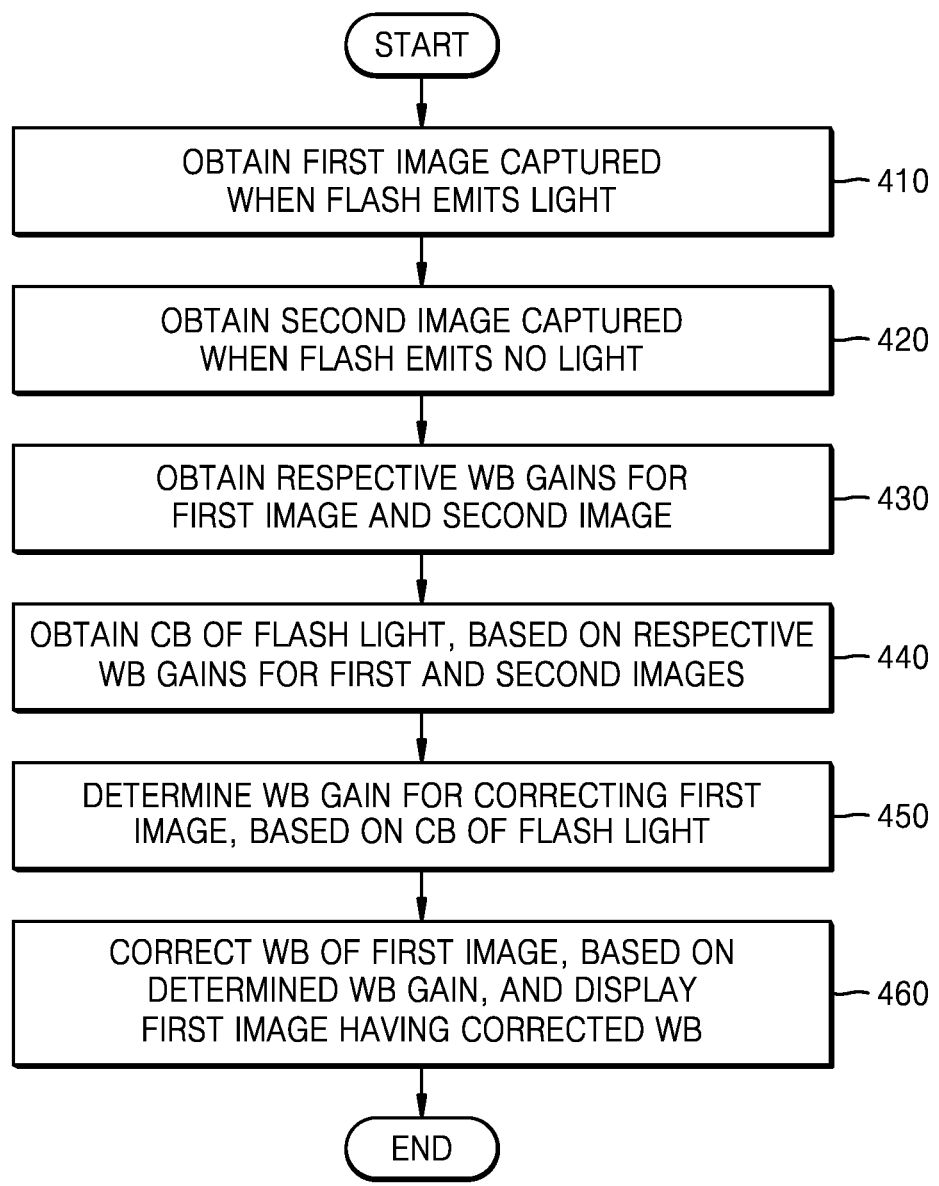
FIGS. 4 and 5 are flowcharts of a method of correcting a white balance (WB) of an image, according to an embodiment.

FIG. 4 is a flowchart of a method of correcting a WB of an image, according to an embodiment.

Referring to FIG. 4, in operations 410 and 420, the electronic device 100 may obtain the first image captured by photographing a subject with radiation of a flash and the second image captured by photographing the subject without radiation of the flash. According to an embodiment, the first image may be a first image captured using the flash light, and the second image may be a second image captured when only ambient light exists without the flash light.

In operation 430, the electronic device 100 may obtain respective WB gains for the first image and the second image. The WB gains of the first and second images may be obtained according to various methods for obtaining a WB gain of an image.

In operation 440, the electronic device 100 may obtain a CB of the flash light, based on the respective WB gains for the first and second images obtained in operation 430.

According to an embodiment, a CB for a light source having the flash light in addition to the ambient light may be obtained based on the WB gain of the first image. A CB for the ambient light may be obtained based on the WB gain of the second image. Thus, according to an embodiment, a CB for the flash light may be obtained based on the CB for the light source having the flash light in addition to the ambient light and the CB for the ambient light.

According to an embodiment, the electronic device 100 may obtain an influence of the flash light on the first image, based on respective representative luminance values of the first and second images, and may obtain the CB of the flash light, based on at least one of the influence of the flash light on the first image and the respective WB gains of the first and second images. According to an embodiment, the representative luminance value of each image may be a representative luminance value representing a brightness degree of the entire image or a subject included in the image.

According to an embodiment, the representative luminance value of each image may be determined based on exposure control values according to the APEX standard. The exposure control values may include at least one of an aperture value, a shutter velocity, and sensor sensitivity.

In operation 450, the electronic device 100 may correct the first image, based on the CB of the flash light obtained in operation 440.

According to an embodiment, the electronic device 100 may split the first image and the second image into one or more blocks and may obtain a difference between the respective luminance values of the first image and the second image in the one or more blocks. According to an embodiment, the electronic device 100 may obtain a WB gain for correcting the color of the first image, based on at least one of the CB of the flash light obtained in operation 440 and the WB gain of the first image.

According to an embodiment, the electronic device 100 may obtain a representative value for a difference of at least one luminance value, and may obtain the WB gain for correcting the color of the first image, based on at least one of the representative value for the difference of the at least one luminance value, the CB of the flash light, and the WB gain of the first image.

The WB gain for correcting the color of the first image according to an embodiment may be determined based on at least one of a CB of the flash light to which a weight proportional to the representative value for the difference of the at least one luminance value has been applied and a WB gain of the first image to which a weight inversely proportional to the representative value for the difference of the at least one luminance value has been applied.

According to an embodiment, the electronic device 100 may obtain an optimal WB gain for correcting the first image, by using the CB of only the flash light. The electronic device 100 may obtain the WB gain of the first image by using the CB of the flash light, and may correct the WB of the first image, based on the obtained WB gain of the first image.

Figure 5:
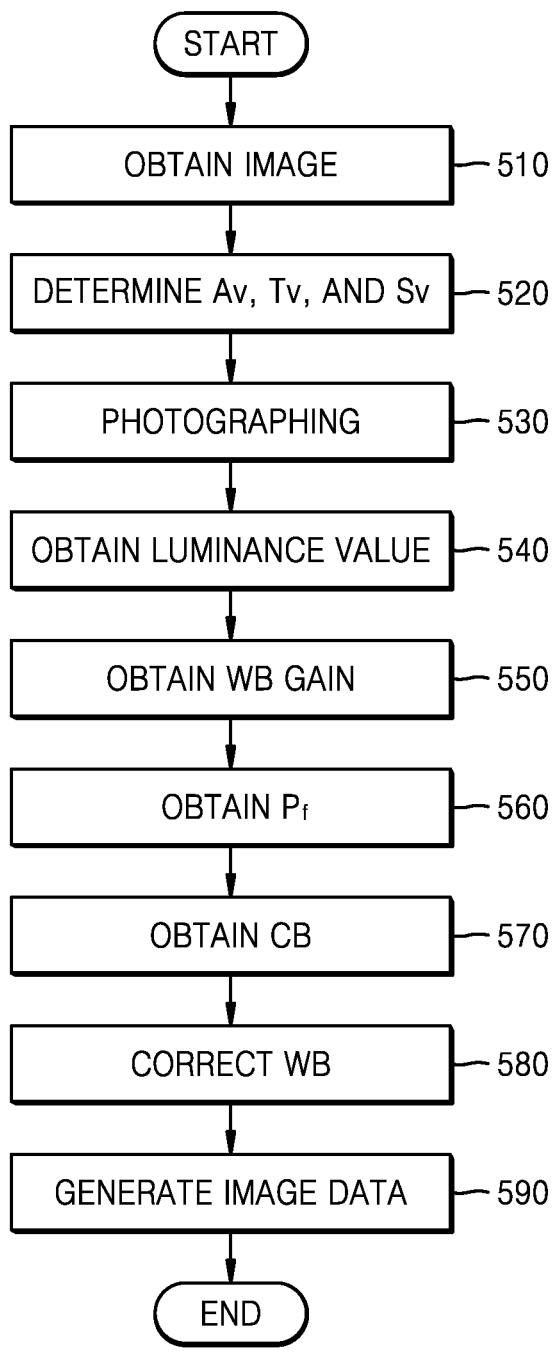

FIG. 5 is a flowchart of a method of correcting a WB of an image, according to an embodiment. The method of FIG. 5 corresponds to the method of FIG. 4, and thus redundant descriptions thereof will be omitted.

Referring to FIG. 5, in operation 510, the electronic device 100 may obtain a pre-captured image for determining exposure control values.

In operation 520, the electronic device 100 may obtain at least one of the aperture value Av, the shutter velocity Tv, and the sensor sensitivity Sv, which are the exposure control values of each image, based on the pre-captured image obtained in operation 510.

In operation 530, the electronic device 100 may obtain a first image captured by photographing a subject with radiation of a flash and a second image captured by photographing the subject without radiation of the flash.

In operation 540, the electronic device 100 may obtain respective luminance values of the first image and the second image, based on the exposure control values. According to an embodiment, the electronic device 100 may obtain the respective luminance values of the first image and the second image, based on the exposure control values, according to the APEX standard. However, the present disclosure is not limited thereto, and the electronic device 100 may obtain the respective luminance values of the first image and the second image according to any of various other methods. According to an embodiment, each of the respective luminance values of the first image and the second image may be a representative luminance value representing a brightness degree of the entire image or a subject included in the image.

In operation 550, the electronic device 100 may obtain respective WB gains for the first image and the second image. The respective WB gains of the first and second images may be obtained according to various methods for obtaining a WB gain of an image.

In operation 560, the electronic device 100 may obtain an influence Pf of the flash light on the first image, based on the respective luminance values of the first and second images obtained in operation 540. Operations 550 and 560 may be arranged in reverse order. According to an embodiment, each of the respective luminance values of the first image and the second image for obtaining the influence Pf of the flash light may be a representative luminance value representing a brightness degree of the entire image or a subject included in the image.

In operation 570, the electronic device 100 may obtain a CB of the flash light, based on at least one of the respective WB gains of the first image and the second image obtained in operation 550 and the influence of the flash light obtained in operation 560. According to an embodiment, a WB gain of each image may be transformed into a CB for a light source corresponding to the image. Accordingly, the CB of the flash light may be obtained based on the CB for the light source corresponding to each image.

In operation 580, the electronic device 100 may correct the WB of the first image by using the WB gain for correcting the first image, determined based on the CB gain of the flash light obtained in operation 570.

In operation 590, the electronic device 100 may generate image data by performing compression with respect to the first image of which the WB has been corrected. The electronic device 100 may store the image data generated in operation 590 in the storage 170, or display the generated image data on the display 144, or transmit the generated image data to an external apparatus via the communication interface 146.

According to an embodiment, because a WB of an image may be adjusted according to a CB of flash light used during photography, an image of a more natural color may be obtained.

Even when the electronic device 100 according to an embodiment uses as the flash 150 a light-emitting device (e.g., an LED) having a large difference in a CB between individuals (this should mean that there is a large difference in CB among light-emitting devices), the electronic device 100 may obtain an image of an appropriate color by obtaining a CB of flash light during each photographing. Even when the electronic device 100 according to an embodiment uses as the flash 150 a light-emitting device (e.g., a xenon pipe) degrading severely over time, because the electronic device 100 corrects an image color by obtaining a CB of flash light during each photographing, the electronic device 100 may not be affected by degradation of the light-emitting device. Thus, according to an embodiment, by obtaining a CB of flash light during each photographing instead of correcting the WB of an image by using a pre-stored CB of flash light, an image of a more natural color may be obtained.

According to an embodiment, the electronic device 100 may receive image data of the first image and the second image and exposure control values as additional information from an external apparatus and may perform a method of correcting a WB of an image according to an embodiment.

Some embodiments may also be embodied as a storage medium including instruction codes executable by a computer such as a program module executed by the computer. A computer readable medium can be any available medium which can be accessed by the computer and includes all volatile/non-volatile and removable/non-removable media.

Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, or the program module, and includes any information transmission medium.

The terminology "unit" used herein may be a hardware component such as a processor or a circuit, and/or a software component that is executed by a hardware component such as a processor.

Although the embodiments of the disclosure have been disclosed for illustrative purposes, one of ordinary skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

While one or more example embodiments have been described with reference to the figures, it will be understood by those of ordinary skill in the art that various changes in form and details may be made therein without departing from the spirit and scope as defined by the following claims.

The invention claimed is:

1. A method of correcting a white balance (WB) of an image, the method comprising:
    obtaining a first image captured by photographing a subject when a flash emits light, and a second image captured by photographing the subject when the flash emits no light;
    obtaining a WB gain of the first image and a WB gain of the second image;
    obtaining a color balance (CB) of flash light representing a strength of each color component of the flash by:
        obtaining a first luminance value corresponding to the first image and a second luminance value corresponding to the second image based on an exposure control value of each of the first image and the second image, wherein the exposure control value includes an aperture value, a shutter velocity, or sensor sensitivity;
        obtaining a first luminance difference corresponding to the first image and a second luminance difference corresponding to the second image based on color components of each of the first image and the second image;
        obtaining a first representative luminance value corresponding to the first image, based on a sum of the first luminance value and the first luminance difference;
        obtaining a second representative luminance value corresponding to the second image, based on a sum of the second luminance value and the second luminance difference;
        obtaining an influence of the flash light on the first image based on the first representative luminance value and the second representative luminance value; and obtaining the CB of the flash light, based on the influence of the flash light on the first image and the obtained WB gains of the first and second images; and correcting a WB of the first image, based on the CB of the flash light.

2. The method of claim 1, wherein the correcting of the WB of the first image comprises:

obtaining a WB gain for correcting the WB of the first image; and correcting the WB of the first image, based on the obtained WB gain for correcting the WB of the first image.

3. The method of claim 1, wherein the obtaining of the CB of the flash light comprises:

obtaining a CB of a light source having the flash light in addition to ambient light, based on the WB gain of the first image;

obtaining a CB of the ambient light, based on the WB gain of the second image; and obtaining the CB of the flash light, based on at least one of the CB of the light source having the flash light in addition to the ambient light and the CB of the ambient light.

4. The method of claim 1, wherein the correcting of the WB of the first image comprises:

splitting the first image and the second image into one or more blocks;

obtaining luminance values for the one or more blocks, in the first image and the second image;

obtaining at least one difference between luminance values of the first image and the second image, in the one or more blocks; and correcting the WB of the first image, based on at least one of the at least one difference between the luminance values, the CB of the flash light, and the WB gain of the first image.

5. The method of claim 4, wherein the correcting of the WB of the first image comprises:

obtaining a representative value for the at least one difference between the luminance values; and correcting the WB of the first image, based on at least one of a CB of the flash light to which a weight proportional to the representative value has been applied and a WB gain of the first image to which a weight inversely proportional to the representative value has been applied.

6. A non-transitory computer-readable recording medium having recorded thereon a program, which, when executed by a computer, performs the method of claim 1.

7. The method of claim 1, further comprising:

splitting the first image into a first plurality of blocks corresponding to a first plurality of luminance values and the second image into a second plurality of blocks corresponding to a second plurality of luminance values;

obtaining a dispersion value representing a difference between the first plurality of luminance values and the second plurality of luminance values; and correcting the WB of the first image based on at least the dispersion value and the CB of the flash light.

8. An electronic device comprising:

an image obtainer configured to obtain a first image captured by photographing a subject when a flash emits light, and a second image captured by photographing the subject when the flash emits no light;

a memory storing the first image and the second image; and at least one controller configured to obtain a white balance (WB) gain of the first image and a WB gain of the second image;

obtain a color balance (CB) of flash light representing a strength of each color component of the flash by:

obtaining a first luminance value corresponding to the first image and a second luminance value corresponding to the second image based on an exposure control value of each of the first image and the second image, wherein the exposure control value includes an aperture value, a shutter velocity, or sensor sensitivity;

obtaining a first luminance difference corresponding to the first image and a second luminance difference corresponding to the second image based on color components of each of the first image and the second image;

obtaining a first representative luminance value corresponding to the first image, based on a sum of the first luminance value and the first luminance difference;

obtaining a second representative luminance value corresponding to the second image, based on a sum of the second luminance value and the second luminance difference;

obtaining an influence of the flash light on the first image based on the first representative luminance value and the second representative luminance value; and obtaining the CB of the flash light, based on the influence of the flash light on the first image and the obtained WB gains of the first and second images; and correct a WB of the first image, based on the CB of the flash light.

9. The electronic device of claim 8, wherein the at least one controller is configured to obtain a WB gain for correcting the WB of the first image, and to correct the WB of the first image, based on the obtained WB gain for corresponding the WB of the first image.

10. The electronic device of claim 8, wherein the at least one controller is configured to split the first image and the second image into one or more blocks, obtain luminance values for the one or more blocks, in the first image and the second image, obtain at least one difference between luminance values of the first image and the second image, in the one or more blocks, and correct the WB of the first image, based on at least one of the at least one difference between the luminance values, the CB of the flash light, and the WB gain of the first image.

11. The electronic device of claim 10, wherein the at least one controller is configured to:

obtain a representative value for the at least one difference between the luminance values; and correct the WB of the first image, based on at least one of a CB of the flash light to which a weight proportional to the representative value has been applied and a WB gain of the first image to which a weight inversely proportional to the representative value has been applied.

12. The electronic device of claim 8, further comprising a display displaying a first image of which a WB has been corrected based on the CB of the flash light.

* * * * *